United States Patent

[11] 3,626,323

| [72] | Inventor | Beat Ineichen<br>Norwalk, Conn. |
|---|---|---|
| [21] | Appl. No. | 785,279 |
| [22] | Filed | Dec. 19, 1968 |
| [45] | Patented | Dec. 7, 1971 |
| [73] | Assignee | The Perkin-Elmer Corporation<br>Norwalk, Conn. |

[54] THERMAL STABILIZING ARRANGEMENT FOR A LASER DEVICE
8 Claims, 5 Drawing Figs.

| [52] | U.S. Cl. | 331/94.5 |
|---|---|---|
| [51] | Int. Cl. | H01s 3/02 |
| [50] | Field of Search | 331/94.5;<br>330/4.3 |

[56] References Cited
UNITED STATES PATENTS

| 3,210,687 | 10/1965 | Boyd et al. | 331/94.5 |
|---|---|---|---|
| 3,361,989 | 1/1968 | Sirons | 331/94.5 |
| 3,387,227 | 6/1968 | Mastrup | 331/94.5 |

Primary Examiner—William L. Sikes
Attorney—Edward R. Hyde, Jr.

ABSTRACT: A laser device is described which includes a heat-generating body enclosing an optical transmission path and having a lasing material positioned in the path. A support housing is provided for the body and means are positioned about the body for cooling the body while substantially inhibiting the transfer of heat from the body to the housing. In this manner the body is maintained at a desirable operating temperature while the temperature of the housing is maintained substantially close to the ambient temperature of its surroundings.

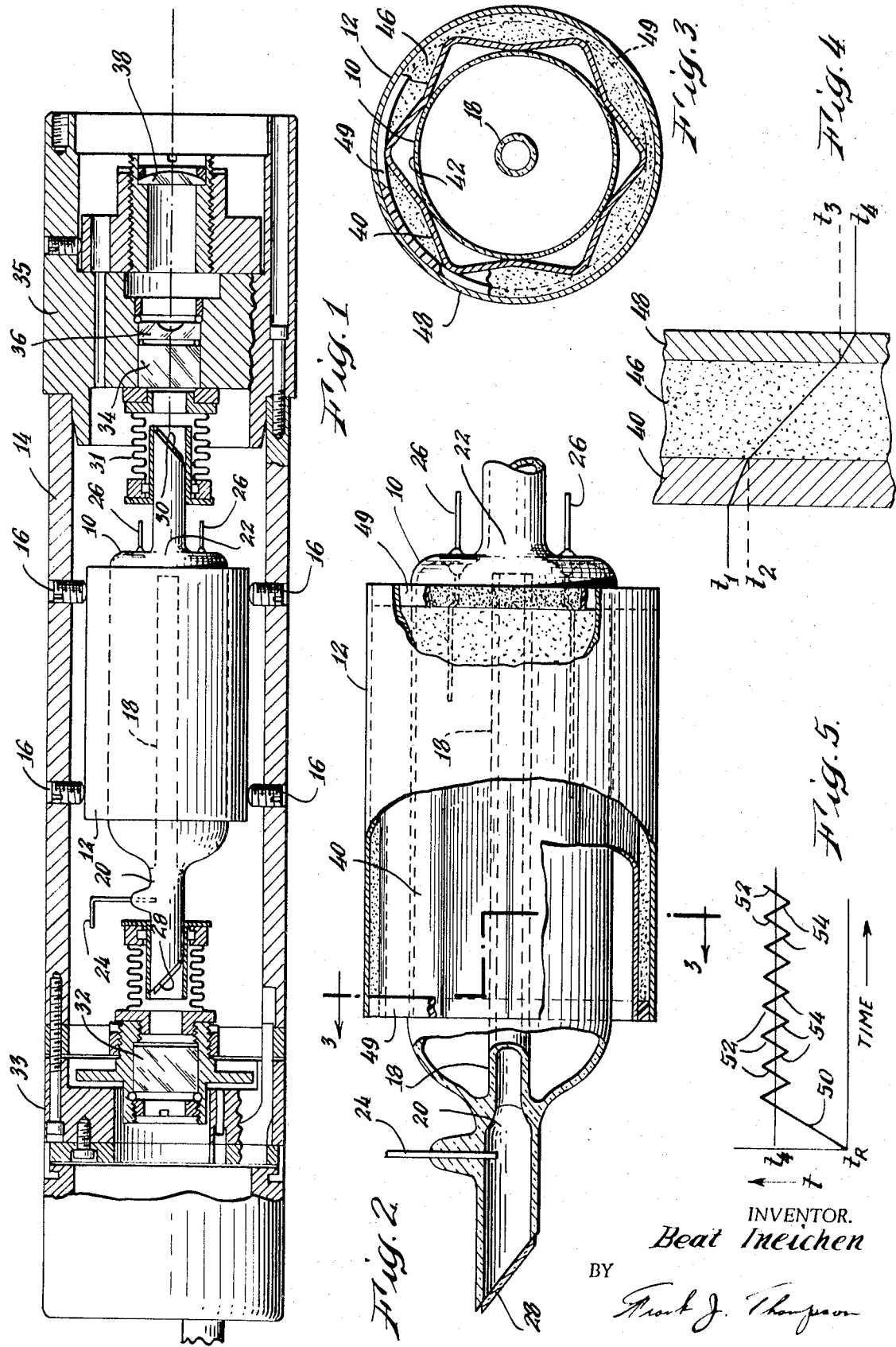

THERMAL STABILIZING ARRANGEMENT FOR A LASER DEVICE

This invention relates to laser devices. The invention relates more particularly to means for stabilizing the position of a laser beam with respect to a reference axis.

Laser light sources are frequently employed in various apparatus such as optical alignment or tooling equipment which advantageously utilized the rectilinear propogation characteristics of a laser light beam. The laser light beam functions as a reference line and substantially increases the accuracy with which an alignment operation can be accomplished.

A gas laser employed in alignment apparatus includes an optical resonant cavity having a discharge or plasma tube containing a gaseous mixture as well as cavity reflecting surfaces positioned near exit windows at opposite ends of the discharge tube. The resonant cavity is mounted in an elongated support housing in a manner for providing that a laser beam thereby generated is, within engineering limitations, parallel to and coincident with a reference line extending through the length of the housing. Setup of the laser for an alignment operation is accomplished by then properly pointing the reference line of the housing with respect to some object or plane. The accuracy of alignment is then limited by lateral and angular derivation of the center of the laser light beam from the reference line.

A laser apparatus of the type described generates heat which adversely alters the initial positioning of the laser beam with respect to the reference line of the housing. The reflective surface of the resonant cavity are generally supported by the housing at spaced apart positions of the cavity. Although apertures are provided in the housing for venting the laser, thermal gradients are developed along its length and a resulting bending force acts upon the housing. The reflective surfaces which are spaced apart along the length of the housing are then subjected to a relative motion which can cause both a lateral and an angular displacement of the laser beam from the reference line. Although the resulting motion of the reflective surfaces and of the beam is relatively small and on the order of 0.0006 inches for example, the effect on the accuracy of an alignment operation is pronounced. In addition, a capillary in a gas laser will be subjected to positional variations as a result of the heat generated. The deviation is particularly pronounced when the laser apparatus utilizes a magnifying and collimating lens arrangement.

Accordingly, it is an object of this invention to provide an improved laser device.

Another object of the invention is to provide an improved laser device having a means for stabilizing the position of a laser light beam with respect to a reference axis thereof.

Another object of the invention is to provide a laser device which substantially reduces the transfer of heat energy between a lasing body and a housing thereof.

A further object of the invention is to provide a novel heat storage and thermal insulating arrangement.

In accordance with features of the present invention, a laser device includes a heat generating body enclosing an optical transmission path and having a lasing material positioned in the path. A support housing is provided for the body and means are positioned about the body for cooling the body while substantially inhibiting the transfer of heat from the body to the housing. In this manner the body is maintained at a desirable operation temperature while the temperature of the housing is maintained substantially near the ambient temperature of its surroundings. Lateral and angular deviations in the position of the beam are thereby substantially reduced.

In accordance with more specific features of this invention, the cooling means includes a mass of thermally insulating material positioned about the heat-generating body in the housing. The cooling means includes a thermally conductive surface member positioned about the mass of insulating material in a manner for transferring heat from the insulating material to the environment enclosed by the housing. The insulating material is adapted for absorbing and discharging heat and establishing a desired average temperature at a surface of the conductive body. In a particular embodiment of the invention the cooling body includes an insulating material comprising magnesium oxide which exhibits relatively high-specific heat capacity and relatively low-thermal conductivity. A mass of this material is provided which is heated by the laser and converted to magnesium hydroxide and cooled by heat transfer through the conductive surface member and thereby reconverted to magnesium oxide. With this arrangement, the heated body is cooled while the mass of the insulating material utilized is substantially less with respect to a mass required to provide an equivalent thermal gradient by inhibition of heat transmission alone. The physical dimensions of the device can therefore be reduced or maintained within useful limits.

These and other objects and features of the invention will become apparent with reference to the following specifications and the drawings, wherein:

FIG. 1 is a sectional view of a laser device constructed in accordance with features of this invention;

FIG. 2 is a view of a plasma tube and cooling means of FIG. 1, partly cut away and partly in section;

FIG. 3 is a view taken along line 3—3 of FIG. 2;

FIG. 4 is a diagram for illustrating a temperature gradient existing across the cooling means; and, FIG. 5 is a diagram illustrating the cyclical variation of temperature with time at a surface of a member of the cooling means.

Referring now to FIG. 1, a laser device is shown to include a body 10 acting as a heat source and comprising a plasma discharge tube for a gas laser. A cooling means 12, discussed in detail hereinafter, is positioned about the tube 10 and this assembly is supported within a tubular steel housing 14 by a plurality of set screws 16 extending through the housing 14 and contacting an outer surface of the cooling means 12.

The plasma discharge tube 10 includes a capillary body 18 which is sealed to a bulbous outer envelope near a throat 20 of the tube 10 and extends substantially over the length of the bulbous portion of the tube 10, terminating short of a second throat 22 of the tube. The tube contains a gas such as helium-neon for providing a discharge-lasing action when electrical potentials are applied between an anode electrode pin 24 and a cathode electrode pin 26. The plasma tube 10 is sealed at opposite ends by windows 28 and 30 formed at the Brewster angle.

An optical resonant cavity is provided for the laser by a plane UHR reflective mirror 32 and a spherical dumper mirror 34 mounted in ends members 33 and 35 respectively of the housing 14. These reflective surfaces form a hemiconfocal optical resonant cavity. A bellows 29 is provided about the Brewster window 28 and functions as a dust shield while a bellows 31 is provided about the Brewster window 30 and similarly functions as a dust shield. The device when excited by electrical potential applied between anode and cathode electrodes lases and an output light beam thereof is expanded and collimated by lenses 36 and 38.

As indicated hereinbefore, the laser generates heat and its temperature increases. In prior arrangements the housing is apertured and the body 10 has been cooled by convection currents. These convection currents have undesirably established thermal gradients along the housing. In accordance with a feature of this invention the cooling means 12 is provided and positioned about the body 10. This cooling means functions to remove heat from the body 10 in order to maintain the body at a desirable operating temperature $t_1$ while substantially inhibiting the transfer of heat to the housing 14. The cooling means 12 is illustrated in greater detail in FIGS. 2, 3 and 4. A sheet 40 of thermally conductive material such as stainless steel 40 is formed into an annular member having corrugated segments which provide resilient contact with an outer surface 42 of the tube 10. This member functions to provide a resilient grip about the tube 10 and therefore adapts for production variations which may occur in the dimensions of the bulbous portions of the tube 10. A mass of the thermal insulating material 46 is supported on and spaced from the surface 42 of the body 10 by the member 40 and is retained on the member 40 by an outer tubular shaped thermally conducting member 48. The material 46 comprises an insulating material exhibiting a relatively low-coefficient $k$ of thermal conductivity and a relatively high coefficient of specific heat capacity such as granular particles of magnesium oxide. On the other hand, the outer member 48 comprises a relatively efficient thermal conductor such as copper. A ring of insulating material such as Teflon and RTV glue 51 are positioned at each end of the body and confine the granular insulating material between the members 40 and 48. The cooling means 12 thus comprises a regenerative thermally insulating material sandwiched between bodies formed of material exhibiting relatively good thermal conducting characteristics.

The cooling body 12 functions both as a heat sink for withdrawing heat from the body 10 while simultaneously inhibiting the transfer of heat to the housing 14. In this manner the creation of thermal gradients along the length of the housing 14 is substantially inhibited and positional variations of the reflective members of the optical resonant cavity are substantially eliminated. The angular and lateral displacement of the output beam with respect to a reference axis which in FIG. 1 comprises the axis of the housing 14 is substantially reduced.

The operation of the cooling body 12 in functioning both as a heat sink and thermal insulator is explained in the following manner. Heat generated by the body 10 flows from the surface 42 to the corrugated member 40 at each of the contact points. The member 40 is formed of a relatively good thermally conductive metal and the heat transfer to this body is relatively efficient. The body 40 is therefore maintained at substantially the temperature of the surface 42 of the tube 10. The outer surface of the cylinder 48 however is at a relatively lower temperature $t_4$ as illustrated by the thermal gradient in FIG. 4 wherein $t_1$ represents the temperature of the outer surface of member 48. The cooling member 12 therefore develops a thermal gradient indicating that the transmission of heat from the body 10 to the housing 14 is substantially inhibited. The body 10 however is cooled by the transfer of heat to the insulator 46. Thermal energy is absorbed by this material from the body 40 and raises the temperature of this material. A mass of the insulating material 40 is provided between the members 40 and 48 and this mass of material exhibits a thermal capacity which, when heated, will result in a cyclic absorption and discharge of heat. This cyclic absorption and discharge of heat causes a cyclic variation in temperature $t_4$ about a desired temperature. The removal and discharge of this heat and the cyclic variations in the temperature $t_4$ is attributed at least in part to the conversion of the magnesium oxide to magnesium hydroxide during absorption of heat and the reconversion of magnesium hydroxide to magnesium oxide during the discharge.

FIG. 5 illustrates the cyclic variation of the temperature $t_4$ over a period of time. A segment of the curve 50 represents the increase in temperature of the surface 48 from room temperature to its operating temperature $t_4$ about which these cyclical variations occur. Segments 52 of increasing temperature represent the absorption of heat from the body 10 and the conversion of magnesium oxide to magnesium hydroxide while the segments 54 of decreasing temperature with time represent the discharge of heat and the reconversion of magnesium hydroxide. The peak to peak magnitude of these variations depends upon the mass of insulating material 46, and, the material, thickness and surface area of the member 48. In general these alterations can be decreased by increasing the mass of the insulating material 46. However, an important advantage attending the described cooling means is the establishment of the desired thermal gradient across this body at a desired temperature $t_1$, while maintaining the thickness of the insulating material 46 to a value substantially compatible with laser sizes adapted for portable use.

Although a particular material such as magnesium oxide has been described, other suitable materials may be employed which may occur to those skilled in the art and which exhibit similar thermal absorbance and discharge characteristics.

In a particular embodiment of the invention, not to be construed as a limitation in any respect, a laser device has been constructed with the following characteristics:

Length and diameter of the bulbous sections of tube 10:
L=3 in.    D=1 5/16 in.
Energy supplied to tube 10 for an output of 1 mw.
Energy = 11 watts
Length of cooling means 12:
L = 2 ¾ in.
Member 40:
Material—Stainless steel
Inside diameter of corrugated member = 1.3125 in.
Outside diameter of corrugated member = 1.549 in.
Surface area = 11.25 in.$^2$.
Thickness = 0.008 in.
Member 48:
Material—copper
Inside diameter = 1.589 in.
Outside diameter = 1.649 in.
Insulating material 46:
Material—granular magnesium oxide
Volume—0.62 in.$^3$.
Housing 14:
Material—Stainless steel
Thickness—174 in.
I.D.=1 ¾ in.
Measured temperatures; at $t_{room}$=20° C.
a. Without cooling means 12
$t_1$ =78° C.
b. With cooling means 12
$t_1$ =40° C.
$t_4$ =28° C.
Outer surface of housing = 22° C.

Thus I have described a heated laser body wherein means are provided for cooling the body to a desired operating temperature while substantially inhibiting transfer of heat from this body to a housing to thereby substantially reduce angular and lateral deviations of a laser beam from a reference axis.

While I have illustrated and described a particular embodiment of my invention, it will be understood that various modifications may be made therein without departing from the spirit of the invention and the scope of the appended claims.

What is claimed is:

1. In a laser device having means for enclosing an optical transmission path a lasing material positioned in said enclosed optical path,
   a housing for said enclosure means, said housing having an outer surface thereof exposed to a surrounding environment existing at a temperature $t_r$,
   said laser device generating heat thereby raising the temperature of said enclosure means, the improvement comprising:
   stationary means positioned about said enclosure means and spaced between said enclosure means and said housing for removing heat from said enclosure and for establishing a thermal gradient between said enclosure and said housing.

2. The device of claim 1 wherein said gradient establishing means includes an insulating material which cyclically absorbs and discharges thermal energy.

3. The device of claim 2 wherein said gradient establishing means comprises a first elongated member positioned about the separated by said enclosure means, a second elongated member spaced about said first member and said insulating material is positioned between said members along their lengths, said first and second members each having a relatively high coefficient of thermal conductivity relative to said insulating material.

4. The device of claim 3 wherein said insulating material comprises magnesium oxide.

5. The device of claim 3 wherein said elongated member provides a resilient contact with an outer surface of said enclosure means.

6. The device of claim 5 wherein said first member is formed in an annular configuration having corrugated segments therefore for providing resilient contact with an outer surface of said enclosure means.

7. In a gas laser device having a plasma discharge tube including an enclosure for containing a gaseous lasing material and enclosing an optical transmission path, a housing for said laser device supporting said discharge tube and said optical resonant cavity reflective surfaces for said device, the improvement comprising:

a first elongated annular metal member having corrugated segments extending longitudinally about said enclosure and contacting an outer surface of said enclosure;

a mass of magnesium oxide positioned about and supported by said first member; and, a second elongated annular metal member positioned about said first member and containing said insulating material, said second member having a relatively high thermal conductivity relative to said magnesium.

8. In an apparatus having a housing enclosing a heated body, said body spaced apart from an inner surface of the housing, an arrangement for cooling said body and inhibiting transfer of heat to said housing comprising a mass of thermal insulating material which cyclically absorbs and discharges thermal energy stationary supported about said body for the transfer of heat to said material and a heat transfer member positioned about said insulating material for the transfer of heat from said insulating material to said member and to a surrounding space within said housing, said member spaced apart from an inner surface of said housing and formed of a material having a relatively high coefficient of thermal conductivity relative to said insulating material.

* * * * *